Oct. 27, 1964  C. P. WENZEL  3,154,300
VEHICLE SUSPENSION CONSTRUCTION
Filed Dec. 4, 1961
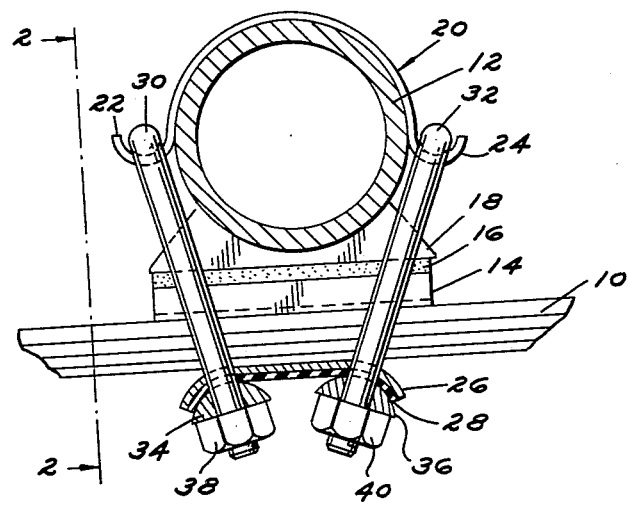
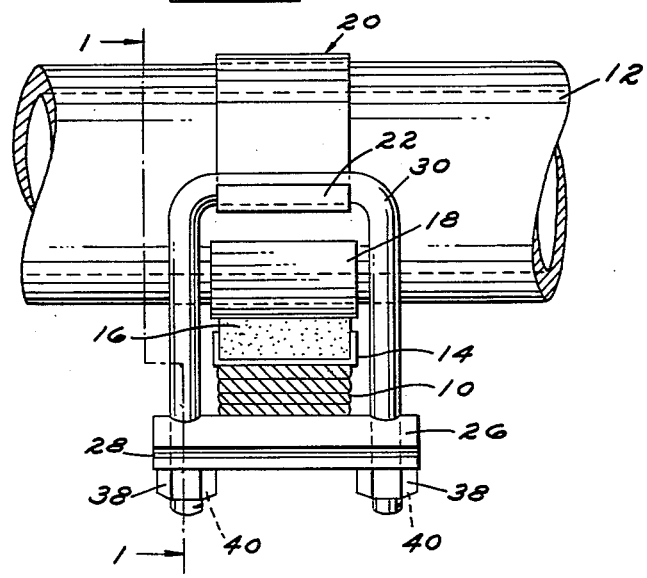
CARL P. WENZEL
INVENTOR.
BY John R. Faulkner
Clifford L. Sadler
ATTORNEYS — 
United States Patent Office 3,154,300  
Patented Oct. 27, 1964

3,154,300  
VEHICLE SUSPENSION CONSTRUCTION  
Carl P. Wenzel, Garden City, Mich., assignor to Ford Motor Company, Dearborn, Mich., a corporation of Delaware  
Filed Dec. 4, 1961, Ser. No. 156,721  
3 Claims. (Cl. 267—30)

The present invention relates to vehicle suspension systems and more particularly to a construction for connecting a leaf spring to an axle housing.

The conventional vehicle suspension system resiliently supports the vehicle body upon the road wheels so that when the wheels strike obstacles in the road, they may move in vertical jounce and rebound paths as determined by the objects encountered. The main suspension spring is adapted to resiliently absorb the shock and permit the vertical wheel movement.

When the wheel strikes an obstacle in the road, however, both vertical and horizontal components are produced. The vertical component causes the wheel to move in jounce or rebound and such movement is absorbed in the suspension spring. The conventional suspension system does not provide a mean for absorbing the horizontal force component with the result that the force produces an objectionable shock that is transmitted to thet passenger compartment of the vehicle.

In view of this state of the art, it is an object of the present invention to provide a suspension system that is adapted to absorb the horizontal forces as well as the vertical components.

More specifically, it is an object of the present invention to provide a construction for connecting a leaf spring to an axle housing that will permit the wheel and associated structure to give or recede in a longitudinal direction in response to horizontal forces.

In accordance with the present invention, a preferred embodiment is provided in which a leaf spring and an axle housing are connected by a pair of pivotal U-bolts. A thick rubber layer is interposed between a spring bracket and an axle housing bracket to resiliently restrict and control the wheel recession movement.

The objects and advantages of the present invention will become amply apparent upon consideration of the following description and accompanying drawings, in which:

FIGURE 1 is a side elevational view of an axle housing to leaf spring connection constructed in accordance with the present invention; and, FIGURE 2 is a rear elevational view of the construction of FIGURE 1.

The present invention has particular application to the means for connecting a longitudinally situated leaf spring to a transverse axle housing, however, it is also adaptable to other suspension arrangements. As an example, the invention may be employed for securing a suspension trailing arm to an axle housing in those cases in which wheel recession is desired.

In FIGURE 1, a laminated leaf spring 10 extends longitudinally of a vehicle and is situated beneath a tube like axle housing 12. A channel-shaped piece 14 is secured above the leaf spring 10 and has its side flanges extending upwardly.

A thick rubber element 16 is fitted into the interior of the channel piece 14 and has sufficient height so that it extends above the side flanges. A bracket 18 is welded to the axle housing 12 and has a flat surface in flush engagement with the upper face of the rubber element 16.

A sheet metal band 20 straddles the axle housing 12. The fore and aft ends of the band 20 are turned upwardly as at 22 and 24 in order to provide saddle portions.

A sheet metal bracket 26 is centrally positioned beneath the leaf spring 10. The ends of the bracket 26 are turned downwardly. A relatively thin rubber layer 28 is positioned against the lower surface of the bracket 26.

A pair of U-bolts 30 and 32 have their midportions carried by the saddles 22 and 24 respectively. The leg portions of the U-bolts 30, 32 extend downwardly and inwardly. Openings are provided in the bracket 26 through which the threaded ends of the legs of the U-bolts 30, 32 pass. Semi-cylindrical pivot members 34 and 36 are received on the threaded ends of the U-bolts 30, 32 and are secured against the rubber layer 28 by means of nuts 38 and 40.

The nuts 38 and 40 are tightened to draw the assembly together and produce the desired amount of preload in the rubber body 16. Depending upon the requirements of a particular installation, it may be desired to run a centrally located aligning bolt through the elements of the leaf spring 10 to secure the channel piece 14 and bracket 26 in position.

The axle housing to leaf spring connection of this invention permits the wheels journalled at the ends of the axle housing 12 to recede rearwardly relative to the spring 10 upon encounter with a road obstacle. Such rearward movement will occur by slight pivoting of the U-bolts 30, 32 in the saddles 22 and 24. At the same time, the rubber element 16 will be loaded in shear to resiliently restrict the wheel recession and produce a force to return the suspension elements to a neutral position when the horizontal forces are removed.

The foregoing description presents the presently preferred embodiment of this invention. Modifications and alterations may occur to those skilled in the art that will come within the scope and spirit of the following claims.

I claim:

1. A vehicle suspension system having an elongated axle housing and an elongated leaf spring arranged generally perpendicular to each other, suspension means interconnecting said axle housing and said leaf spring, said suspension means being adapted to permit relative movement between said axle housing and said leaf spring in a direction generally parallel to the longitudinal axis of said leaf spring, said suspension means comprising a compression loaded resilient rubber element interposed between said axle housing and said leaf spring, a bracket secured to said axle housing and having fore and aft pivot portions, a bracket secured to said leaf spring and having fore and aft pivot portions, fore and aft U-bolts pivotally linking said fore and aft pivot portions respectively, said pivot portions defining pivot axes generally parallel to the axis of said axle housing, said U-bolts being loaded in tension, said tension load being of an amount sufficient to hold said leaf spring, axle housing and rubber element together while permitting said axle housing to move horizontally with respect to said leaf spring when subjected to a horizontal force and to return to its original position when said force is removed, said rubber element resiliently resisting said horizontal movement.

2. A combination of claim 1 wherein said axle housing is situated above said leaf spring.

3. A combination of claim 1 wherein said fore and aft U-bolts lie in planes that intersect beneath said axle housing.

References Cited in the file of this patent

UNITED STATES PATENTS

| | | |
|---|---|---|
| 1,899,913 | McCuen | Feb. 28, 1933 |
| 2,279,518 | Baker | Feb. 24, 1942 |
| 2,550,001 | Button | Apr. 24, 1951 |
| 2,678,819 | Douglass | May 18, 1954 |
| 2,692,135 | Crane | Oct. 19, 1954 |
| 2,795,434 | Gouirand | July 11, 1957 |
| 3,080,161 | Felburn | Mar. 5, 1963 |

FOREIGN PATENTS

| | | |
|---|---|---|
| 34,312 | France | May 5, 1929 |
| 350,136 | Great Britain | June 11, 1931 |
| 452,059 | Great Britain | Aug. 17, 1936 |